July 6, 1937.  A. F. CRAVER  2,086,294
LOCKING MEANS FOR CUT-OFFS
Filed April 21, 1934
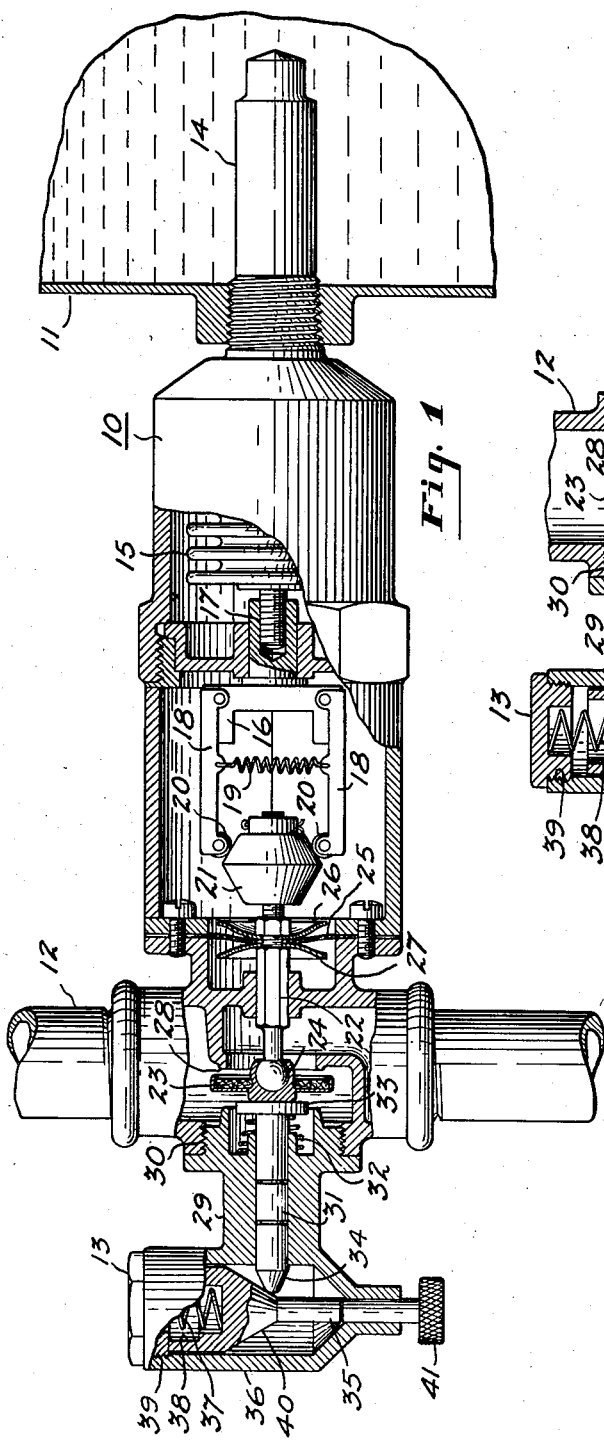
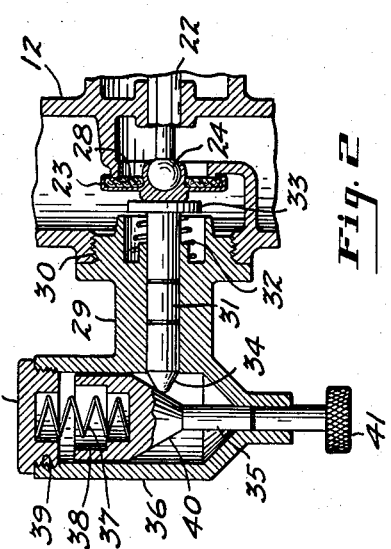
INVENTOR
Albert F. Craver
BY
ATTORNEY Patented July 6, 1937

2,086,294

UNITED STATES PATENT OFFICE 2,086,294

LOCKING MEANS FOR CUT-OFFS

Albert F. Craver, Lakewood, Ohio, assignor to The Cleveland Heater Company, Cleveland, Ohio, a corporation of Ohio Application April 21, 1934, Serial No. 721,754

3 Claims. (Cl. 126—351)

This invention relates to a locking means for use on valves and more particularly for use on valves operated by such means as a thermostat. It prevents the operation of the valve in one direction until such a time as a release mechanism is actuated. It is especially applicable for use on gas water heaters.

In the usual set-up for a gas water heater, a thermostatically controlled valve is placed in the gas line so that its thermostat shall be actuated by the temperature of the heated water. Usually, this thermostatic control comprises a simple valve in the fuel line of the heater, which valve is open whenever the water cools off and closes when it heats up to a predetermined point. It is not unusual that a demand exists for a certain quantity of water, but there is no necessity of continuously heating the boiler.

This invention has provided means such that a single boiler full of hot water may be provided, after which the thermostatically controlled valve automatically closes as usual. To this has been added a lock that engages against the closed valve and maintains it closed even against later pressure of the thermostat. The lock may be released only by manual operation.

This type of control may be designated as semi-automatic since it automatically heats one supply of water, but must be manually operated before any further water may be heated.

It is to be observed that a lock of this type may be used on any similar reciprocating element. And in particular, it may be used where the reciprocating element is a member of an electrical control.

In the drawing, Figure 1 is a view partly in section of the thermostat and lock with the valve in open position.

Figure 2 is a vertical section of the lock in locking position.

In Fig. 1, 10 indicates generally the thermostat secured to the boiler 11 at one end, and to the gas line 12 adjacent to the other end, and having at the latter end the lock 13. The thermostat includes the heat responsive unit 14 located within the boiler to be affected by the termperature of the water therein. Connected to the unit 14 is a bellows 15, expansible axially of the thermostat in response to expansion of the usual fluid contained therein and in the unit 14. Secured to the bellows 15 and movable therewith, is a cross-head 16. The means by which the cross-head 16 is secured to the bellows 15 comprises a screw-thread 17, by means of which the relationship between the cross-head and the bellows may be varied, by rotating the cross-head 16. Variation of this relationship provides adjustment for the temperature at which the valve operates. Pivotally mounted on the cross-head, are arms 18 urged inwardly towards each other by a spring 19. On the ends of the arms are rollers 20, arranged to operate over the duo-frusto conical cam 21. This cam is fastened to one end of valve stem 22, to the other end of which a valve head 23 is secured by a ball and socket joint 24.

Intermediate the cam 21 and the valve head 23 is secured a flexible diaphragm 25 having cups 26 and 27 in abutting relationship thereto. This diaphragm provides a tight seal as is well known in the art. The valve 23 seats against the valve seat 28 and thereby controls the flow of fuel from the gas main to the heater. It will be obvious that a thermostatic control is provided for the fuel supply to the water heater.

To the end of the thermostat 10, adjacent the valve 23 is secured the thermostat lock 13. The lock 13 comprises a body member 29 screw-threaded as at 30 into the thermostat, or more particularly, the thermostat valve housing. Reciprocably mounted in the body member 29 is a plunger 31 having a spring 32 therearound abutting against head 33 to urge the head 33 against valve head 23. The spring 32 maintains the head 33 in contact with valve head 23. The end of the plunger 31 opposite head 33 is tapered as at 34. Reciprocally mounted to move in a direction at right angles to that of plunger 31, is a second plunger 35 moving in a cylindrical portion 36 of body member 29. The plunger 35 is urged in a downward position as shown in Fig. 2 by spring 37 contained in a bore 38 of the plunger, and abutting against cap member 39.

Intermediate its ends, plunger 35 is provided with tapering walls 40 against which engages the tapered end 34 of plunger 31. To the end of plunger 35 opposite the plug 39 is provided a button 41 for manual operation. Particular attention is to be paid to the tapering wall 40. It accommodates for variations in manufacture, and also compensates for wear in the parts. The particular point of contact between the plunger 31 and the taper makes no difference, since the spring 37 will always actuate plunger 35 downwardly to force taper 40 until contact with plunger 31 takes place, regardless of the point contact occurs. And by making the walls tapered, a tight fit with no play will be thereby effected under all circumstances.

The operation of the device is as follows:

In case a tank full of hot water is desired and the water is cool at the time, the unit 14 will be cold and the bellows 15 contracted toward the right as shown in Figure 1. This draws the crosshead 16 and the rollers 20 to the right. As soon as rollers 20 pass beyond the apex of the cam 21, the cam 21 is urged with a snap action to the left, opening valve 23. As shown in Figure 1, button 41 has been pressed upwardly against the action of spring 37, permitting plunger 31 to slide to the left against the smaller portion of the taper 40. The movement of the plunger 31 to the left is, of course, produced by the action of the valve in opening. The button 41 will have to have been opened manually.

Gas may now flow past the valve 23 and into the heater whereupon the water in boiler 11 is heated. As soon as the supply is heated, the thermostat element 14 expands, moving cross-head 16 and rollers 20 to the left as shown in Fig. 1, and valve 23 is closed.

Through the action of spring 32, plunger 31 follows the movement of valve 23 to the right, permitting plunger 35 to move downwardly under the action of its spring 37, to the position shown in Fig. 2.

In case the thermostat later demands more heat and tends to urge the valve 23 to open position, motion of the valve 23 is prevented by plunger 31 that is locked in its right hand position as shown in the drawing. The taper of plunger 31 as shown at 34 and the taper 40 of plunger 35 are such that the plunger cannot be moved upwardly against the action of spring 37 by pressure to the left exerted against head 33 and plunger 31.

Therefore, as will be readily understood, for any further operation of the heater, it is necessary for the operator to release the lock by pressing button 41 upwardly whereupon the valve 23 will quickly open. In the open position as shown in Fig. 1, the pressure of spring 37 is insufficient to force plunger 31 to the right against the pressure of the thermostat.

In this specification and claims, it is to be understood that the term fuel is used generically to include all fuels, such as oil or gas; and that the term valve includes any fluid cut-off means. Furthermore, although the bellows mechanism here shown is described as a thermally responsive element, it is to be understood that equivalent structure, and equivalent usages, such as use in response to pressure changes, may be employed.

Having thus described my invention, what I claim is:

1. In combination with a fuel supply passage, valve mechanism including a fuel control valve in said passage, a thermostat, snap-action mechanism connecting said thermostat and valve, said mechanism including resilient means whereby to transmit a limited force from said thermostat for opening or closing said valve, and means operable automatically when said valve is closed to overcome the maximum opening force transmitted by said snap-action mechanism to thereby hold said valve in closed position.

2. In combination with a fuel supply passage, valve mechanism including a fuel control valve in said passage, a thermostat, snap-action mechanism connecting said thermostat and valve, said mechanism including resilient means whereby to transmit a limited force from said thermostat for opening or closing said valve, means operable automatically when said valve is closed to overcome the maximum opening force transmitted by said snap-action mechanism to thereby hold said valve in closed position, and means for releasing said last named means to permit operation of said valve.

3. In combination with a fuel supply passage, valve mechanism including a fuel control valve in said passage, a thermostat, snap-action mechanism connecting said thermostat and valve, said mechanism including resilient means whereby to transmit a limited force from said thermostat for opening or closing said valve, means operable automatically when said valve is closed to overcome the maximum opening force transmitted by said snap-action mechanism to thereby hold said valve in closed position, and a manually operable device connected to said means whereby the same may be released to permit operation of said valve.

ALBERT F. CRAVER.